United States Patent
Inohiza

(10) Patent No.: US 8,693,446 B2
(45) Date of Patent: Apr. 8, 2014

(54) BASE STATION, MOBILE STATION AND MOBILE COMMUNICATION METHOD

(75) Inventor: Hirohiko Inohiza, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1329 days.

(21) Appl. No.: 11/760,520

(22) Filed: Jun. 8, 2007

(65) Prior Publication Data

US 2007/0286127 A1 Dec. 13, 2007

Related U.S. Application Data

(60) Provisional application No. 60/812,237, filed on Jun. 9, 2006.

(51) Int. Cl.
*H04B 7/212* (2006.01)

(52) U.S. Cl.
USPC ........... 370/337; 370/336; 370/335; 370/329; 370/342; 370/331; 455/450; 455/451; 455/452.1; 455/509; 455/436

(58) Field of Classification Search
USPC ................. 370/331, 337, 336, 335, 329, 342; 455/450, 451, 452.1, 509, 436, 437, 455/442
See application file for complete search history.

(56) References Cited

U.S. PATENT DOCUMENTS

| | | | | |
|---|---|---|---|---|
| 7,567,639 | B2 * | 7/2009 | Huh et al. ............... | 375/365 |
| 7,602,843 | B2 * | 10/2009 | Cho et al. ............... | 375/228 |
| 2005/0288020 | A1 * | 12/2005 | Cho et al. ............... | 455/436 |
| 2006/0009228 | A1 | 1/2006 | Kang et al. | |
| 2006/0046643 | A1 | 3/2006 | Izumikawa et al. | |
| 2006/0153227 | A1 * | 7/2006 | Hwang et al. ............... | 370/465 |
| 2006/0239264 | A1 * | 10/2006 | Kang et al. ............... | 370/390 |
| 2007/0230326 | A1 * | 10/2007 | Pandoh et al. ............... | 370/208 |

FOREIGN PATENT DOCUMENTS

| | | |
|---|---|---|
| JP | 11266216 A | 9/1999 |
| JP | 2006005946 A | 1/2006 |

OTHER PUBLICATIONS

International search report for corresponding PCT application PCT/JP2007/061318.
R1-060378; E-UTRA Downlink Control Channel Structure and TP; Motorola, 3GPP TSG RAN1#44; Denver, USA; Feb. 13-Feb. 17, 2006.
IEEE Standards; IEEE Standard for Local and metropolitan area networks; IEEE Computer Society and the IEEE Microwave Theory and Techniques Society; Sponsored by the LAN/MAN Standards Committee; IEEE Std 802.16- 2004 (Revision of IEEE Std 802.16-2001); IEEE3 Park Avenue, New York, NY 10016-5997, USA.

* cited by examiner

Primary Examiner — Khalid W Shaheed
(74) Attorney, Agent, or Firm — DLA Piper LLP (US)

(57) ABSTRACT

A WiMAX compatible base station (BS) includes: an allocator unit (10B, 10C) configured to allocate allocation information of the downlink burst (DL-MAP) as transmission information in a first region (MAP region), and to allocate the downlink burst as transmission information in the second region (downlink burst region); and a transmitter unit (10F) configured to transmit the allocation information of the downlink burst with a non-directional beam, and to transmit the downlink burst with a non-directional beam or a directional beam. When detecting an unused region (A) where no transmission information is allocated after allocating the transmission information in the first region and the second region in the frame structure, the allocator unit is configured to reallocate, by use of the detected unused region, the allocation information of the downlink burst as the transmission information in the first region.

6 Claims, 18 Drawing Sheets

| FIELD | NOTES |
|---|---|
| DIUC | USED DIUC (MODULATION CLASS) |
| CID | |
| OFDMA SYMBOL OFFSET | |
| SUBCHANNEL OFFSET | |
| NO. OFDMA TRIPLE SYMBOL | NUMBER OF USED SYMBOLS |
| NO. SUBCHANNELS | NUMBER OF SUBCHANNELS |
| REPETITION CODING INDICATION | NUMBER OF TIMES FOR TRANSMITTING DATA TO BE STORED IN BURST<br>0b00 : 0<br>0b01 : 2<br>0b10 : 4<br>0b11 : 6 |

FIG.10

| FIELD | NOTES |
|---|---|
| USED SUBCHANNEL BITMAP | NUMBER OF USED SUBCHANNELS |
| REPETITION_CODING_INDICATION | NUMBER OF TIMES FOR TRANSMITTING DL-MAP<br>0b00 : 0<br>0b01 : 2<br>0b10 : 4<br>0b11 : 6 |
| CODING_INDICATION | CODING SCHEME OF DL-MAP |
| DL-MAP_LENGTH | NUMBER OF SLOTS OF DL-MAP |
| EXTENDED_REPETITION _CODING_INDICATION | b0 : UNUSED<br>b1 : USED |

FIG.16

| FIELD | NOTES |
|---|---|
| USED SUBCHANNEL BITMAP | NUMBER OF USED SUBCHANNELS |
| REPETITION_CODING_INDICATION | NUMBER OF TIMES FOR TRANSMITTING DL-MAP<br>0b00 : 0<br>0b01 : 2<br>0b10 : 4<br>0b11 : 6 |
| CODING_INDICATION | CODING SCHEME OF DL-MAP |
| DL-MAP_LENGTH | NUMBER OF SLOTS OF DL-MAP |
| EXTENDED_REPETITION _CODING_INDICATION | b0 : UNUSED<br>b1 : USED |
| EXTENDED_REPETITION _SYMBOL_NUMBER | 0b00 : 0<br>0b01 : 2<br>0b11 : 4<br>0b10 : 6 |

FIG.20

| FIELD | NOTES |
|---|---|
| USED SUBCHANNEL BITMAP | NUMBER OF USED SUBCHANNELS |
| REPETITION_CODING_INDICATION | NUMBER OF TIMES FOR TRANSMITTING DL-MAP<br>0b00 : 0<br>0b01 : 2<br>0b10 : 4<br>0b11 : 6 |
| CODING_INDICATION | CODING SCHEME OF DL-MAP |
| DL-MAP_LENGTH | NUMBER OF SLOTS OF DL-MAP |
| EXTENDED_REPETITION _CODING_INDICATION | b0 : UNUSED<br>b1 : USED |
| EXTENDED_REPETITION SIZE | |

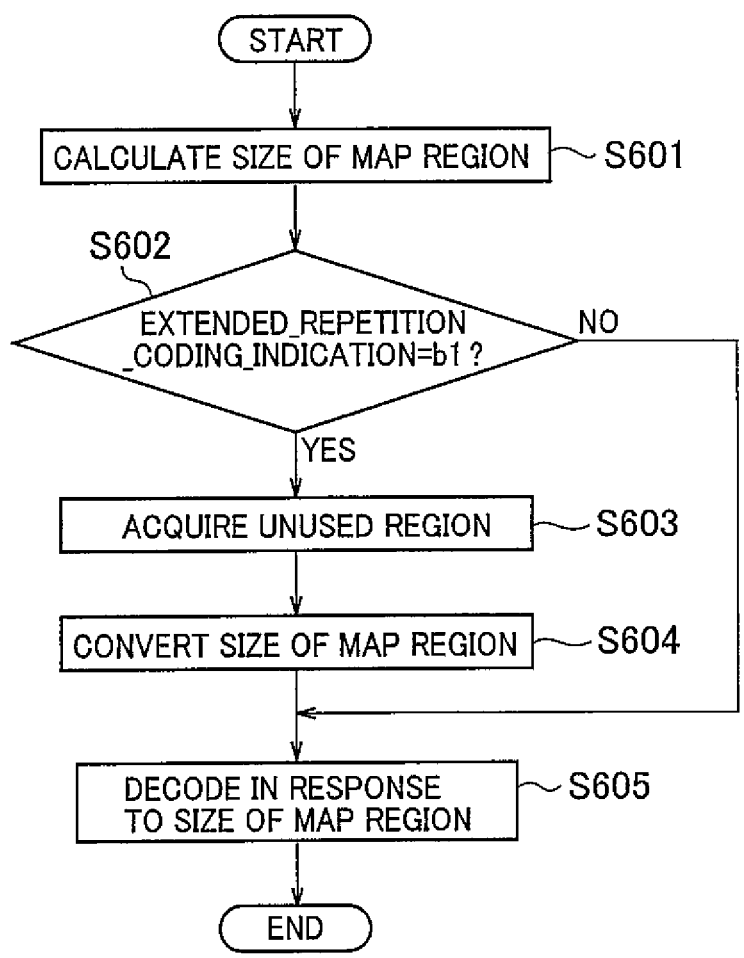

BASE STATION, MOBILE STATION AND MOBILE COMMUNICATION METHOD

CROSS REFERENCE TO RELATED APPLICATION

This application is based upon and claims the benefit of priority from the U.S. Provisional Application No. 60/812,237, filed on Jun. 9, 2006; the entire contents of which are incorporated herein by reference.

The entire contents of "IEEE Standard for Local and Metropolitan Area Networks Part 16: Air Interface for Fixed Broadband Wireless Access Systems (IEEE Std 802.16-2004), Oct. 1, 2004", and "IEEE Standard for Local and Metropolitan Area Networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 (IEEE Std 802-16e-2005), February, 2006" are incorporated in this application by reference.

BACKGROUND OF THE INVENTION

1. Field of the Invention

The present invention relates to: a mobile communication method for transmitting a downlink burst from a base station to a mobile station by use of a frame structure including a first region and a second region; and a base station and a mobile station used in this method.

2. Description of the Related Art

In recent years, the "Worldwide Interoperability for Microwave Access (WiMAX) Forum" is promoting standardization of a mobile communication system including a WiMAX compatible mobile station SS and a WiMAX compatible base station BS.

In this mobile communication system, the WiMAX compatible base station BS transmits a downlink burst to the WiMAX compatible mobile station SS, by use of a frame structure including a MAP region (a first region) and a downlink burst region (a second region). FIG. 1, FIG. 2, and FIG. 3 show examples of the frame structure.

Specifically, the WiMAX compatible base station BS allocates: DL-MAP (allocation information of the downlink burst) and the like as transmission information in the MAP region; and a downlink burst concerning the DL-MAP and the like as transmission information in the downlink burst region.

Here, the DL-MAP includes information on a position in the downlink burst region where the downlink burst is allocated.

Meanwhile, as shown in FIG. 4, the WiMAX compatible base station BS transmits the transmission information in the downlink burst region (such as the downlink burst), to each WiMAX compatible mobile station with a directional beam by using an adaptive antenna system (AAS).

Here, the WiMAX compatible base station BS may also transmit part of the transmission information in the downlink burst region to all the WiMAX compatible mobile stations SS located in the area managed by the WiMAX compatible base station BS with a non-directional beam instead of using the AAS.

Moreover, the WiMAX compatible base station BS transmits the transmission information in the MAP region (such as the DL-MAP), to all the WiMAX compatible mobile stations SS located in the area managed by the WiMAX compatible base station BS with the non-directional beam instead of using the AAS.

However, in the above-described mobile communication system, there is a problem in that the WiMAX compatible mobile station SS cannot determine the position in the downlink burst region where the downlink burst is allocated, if the WiMAX compatible mobile station SS fails in reception processing of the DL-MAP transmitted from the WiMAX compatible base station BS, and therefore cannot receive the downlink burst.

In particular, as shown in FIG. 4, an area where the DL-MAP constituting the transmission information in the MAP region to be transmitted with the non-directional beam can be reached (such an area will be hereinafter referred to as a MAP region reachable area) is narrower than an area where the downlink burst constituting the transmission information in the downlink burst region to be transmitted with the directional beam can be reached (such an area will be hereinafter referred to as a downlink burst region eachable area). Accordingly, there is a problem in that a possibility of failure in the reception processing of the DL-MAP by the WiMAX compatible mobile station SS is higher than a possibility of failure in the reception processing of the downlink burst by the WiMAX compatible mobile station SS.

Moreover, in the above-described mobile communication system, a proportion of the DL-MAP in the frame structure becomes substantial by simply increasing the number of times for transmitting the DL-MAP in order to improve a reception probability for the DL-MAP. As a consequence, the transmission speed of the downlink burst is deteriorated.

BRIEF SUMMARY OF THE INVENTION

The present invention has been made in view of the foregoing circumstances. An object of the present invention is to provide a base station, a mobile station, and a mobile communication method capable of improving a reception probability of DL-MAP without substantially increasing a proportion of the DL-MAP in a frame structure.

A first aspect of the present invention is summarized as a base station configured to transmit a downlink burst to a mobile station by use of a frame structure having a first region and a second region, including: an allocator unit configured to allocate allocation information of the downlink burst as transmission information in the first region, and to allocate the downlink burst as transmission information in the second region; and a transmitter unit configured to transmit the allocation information of the downlink burst with a non-directional beam, and to transmit the downlink burst with a non-directional beam or a directional beam; wherein, when detecting an unused region where no transmission information is allocated after allocating the transmission information in the first region and the second region in the frame structure, the allocator unit is configured to reallocate, by use of the detected unused region, the allocation information of the downlink burst as the transmission information in the first region.

In the first aspect, when detecting the unused region in the first region after allocating the transmission information in the first region, the allocator unit can be configured to reallocate the allocation information of the downlink burst as the transmission information in the unused region.

In the first aspect, when detecting the unused region in the second region after allocating the transmission information in the first region, the allocator can be configured to reduce the second region in an amount equivalent to a size of the unused region while extending the first region in the amount, and to reallocate the allocation information of the downlink burst as the transmission information in the extended first region.

A second aspect of the present invention is summarized as a mobile station configured to receive a downlink burst from a base station by use of a frame structure having a first region and a second region, including: a receiver unit configured to receive allocation information of the downlink burst and a prefix transmitted with a non-directional beam as transmission information in the first region, and to receive the downlink burst transmitted with a non-directional beam or a directional beam as transmission information in the second region; a detector unit configured to detect a position in the first region where the allocation information of the downlink burst is allocated based on the received prefix, and a decoder unit configured to decode the downlink burst based on the allocation information of the downlink burst allocated to the detected position.

A third aspect of the present invention is summarized as a mobile communication method for transmitting a downlink burst from a base station to a mobile station by use of a frame structure having a first region and a second region, the method including: allocating, at the base station, allocation information of the downlink burst as transmission information in the first region; allocating, at the base station, the downlink burst as transmission information in the second region; detecting, at the base station, an unused region in the frame structure where no transmission information is allocated after allocating the transmission information in the first region and the second region; reallocating, at the base station, the allocation information of the downlink burst as the transmission information in the first region, by use of the detected unused region; transmitting, at the base station, the allocation information of the downlink burst, with a non-directional beam; and transmitting, at the base station, the downlink burst with a non-directional beam or a directional beam.

In the third aspect, the mobile communication method can further include: receiving, at the mobile station, the allocation information of the downlink burst and a prefix transmitted with the non-directional beam as the transmission information in the first region; receiving, at the mobile station, the downlink burst transmitted with the non-directional beam or the directional beam as the transmission information in the second region, detecting, at the mobile station, a position in the first region where the allocation information of the downlink burst is allocated, based on the received prefix; and decoding, at the mobile station, the downlink burst based on the allocation information of the downlink burst allocated to the detected position.

BRIEF DESCRIPTION OF THE SEVERAL VIEWS OF THE DRAWINGS

FIG. 10 is a view showing an example of a format of a downlink frame prefix (DLFP) created by the MAP region allocator unit of the WiMAX compatible base station according to the first embodiment of the present invention.

FIG. 16 is a view showing an example of a format of a downlink frame prefix (DLFP) created by the MAP region allocator unit of the WiMAX compatible base station according to the second embodiment of the present invention.

FIG. 20 is a view showing an example of a format of a downlink frame prefix (DLFP) created by the MAP region allocator unit of the WiMAX compatible base station according to the third embodiment of the present invention.

FIG. 22 is a flowchart showing operations of a WiMAX compatible mobile station according to the third embodiment of the present invention.

DETAILED DESCRIPTION OF THE INVENTION

Figure 4:
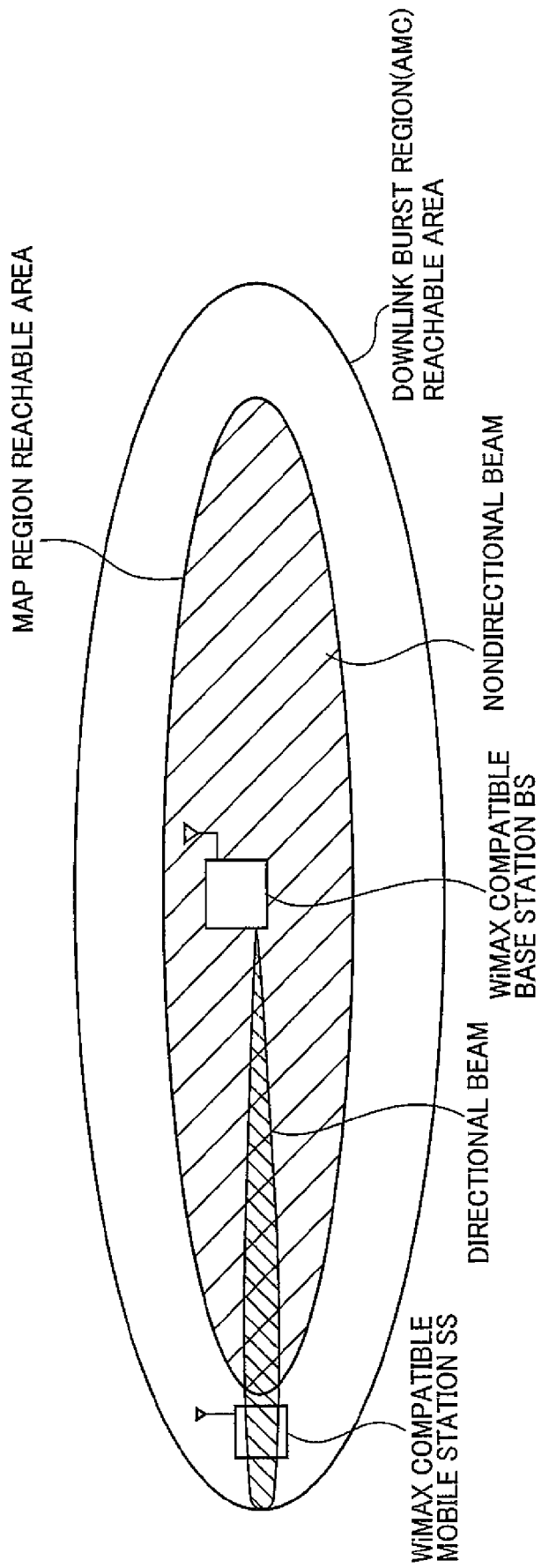
FIG. 4 is an overall configuration diagram of a mobile communication system including a WiMAX compatible base station and a WiMAX compatible mobile station.

Configuration of a Mobile Communication System According to a First Embodiment of the Present Invention A configuration of a mobile communication system according to a first embodiment of the present invention will be described with reference to FIG. 4 to FIG. 12. As shown in FIG. 4, a mobile communication system of this embodiment includes a WiMAX compatible mobile state SS and a WiMAX compatible base station BS.

Specifically, as shown in FIG. 4, the WiMAX compatible base station BS is configured to transmit transmission information in a downlink burst region (such as a downlink burst), to each WiMAX compatible mobile station SS with a directional beam by use of an AAS.

Moreover, the WiMAX compatible base station BS is configured to transmit transmission information in a MAP region (much as DL-MAP), to all the WiMAX compatible mobile stations SS located in the area managed by the WiMAX compatible base station BS with a non-directional beam instead of using the AAS.

The WiMAX compatible base station BS is a base station compatible with a protocol provided by the WiMAX, and is configured to transmit the downlink burst to the WiMAX compatible mobile station SS by use of a frame structure including a MAP region (a first region) and a downlink burst region (a second region).

Figure 5:
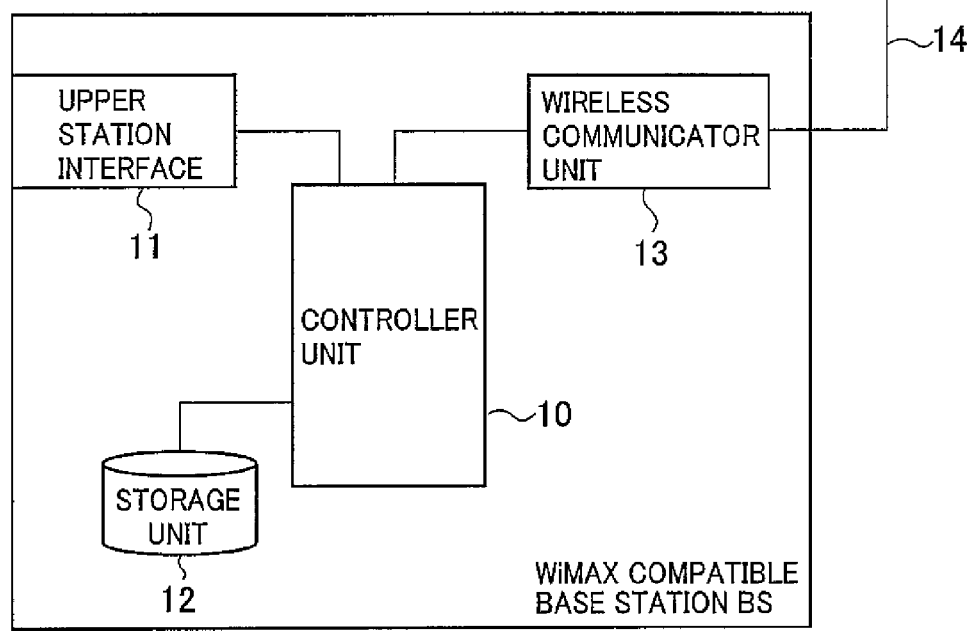
FIG. 5 is a hardware functional block diagram of a WiMAX compatible base station according to a first embodiment of the present invention.

The WiMAX compatible base station BS has a hardware configuration, which includes a controller unit 10, an upper station interface 11, a storage unit 12, and a wireless communicator unit 13, as shown in FIG. 5.

The upper station interface 11 has a communication interface function with a upper station of the WiMAX compatible base station BS, while the storage unit 12 is formed of a flash memory and the like.

Meanwhile, the wireless communicator unit 13 is configured to perform wireless communication with the WiMAX compatible mobile stations SS, through a transmission-reception antenna 14.

The controller unit 10 is formed of a central processing unit (CPU) or the like, and is configured to control the respective units 11 to 13.

Figure 6:
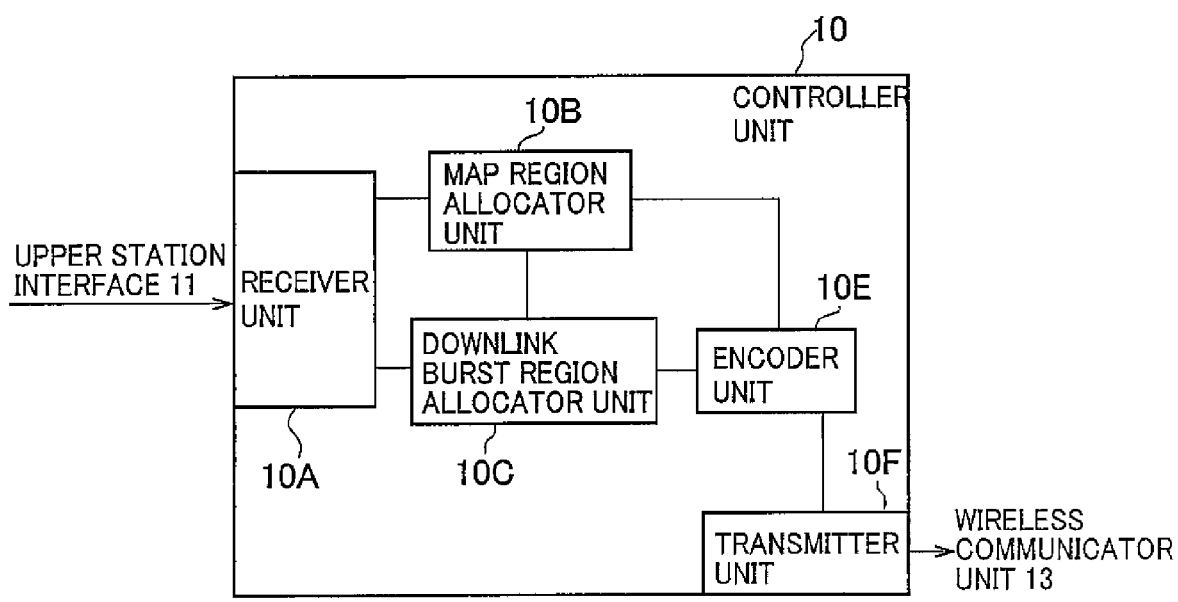
FIG. 6 is a software functional block diagram of a controller unit of the WiMAX compatible base station according to the first embodiment of the present invention.

The controller unit 10 has a software configuration as shown in FIG. 6, which includes a receiver unit 10A, an MAP region allocator unit 10B, a downlink burst region allocator unit 10C, an encoder unit 10E, and a transmitter unit 10F.

The receiver unit 10A is configured to receive a downlink burst transmitted from the upper station of the WiMAX Compatible base station BS.

The MAP region allocator unit 10B is configured to calculate control information concerning the downlink burst received by the receiver unit 10A, and to allocate the calculated control information as the transmission information in the MAP region.

Figure 1:
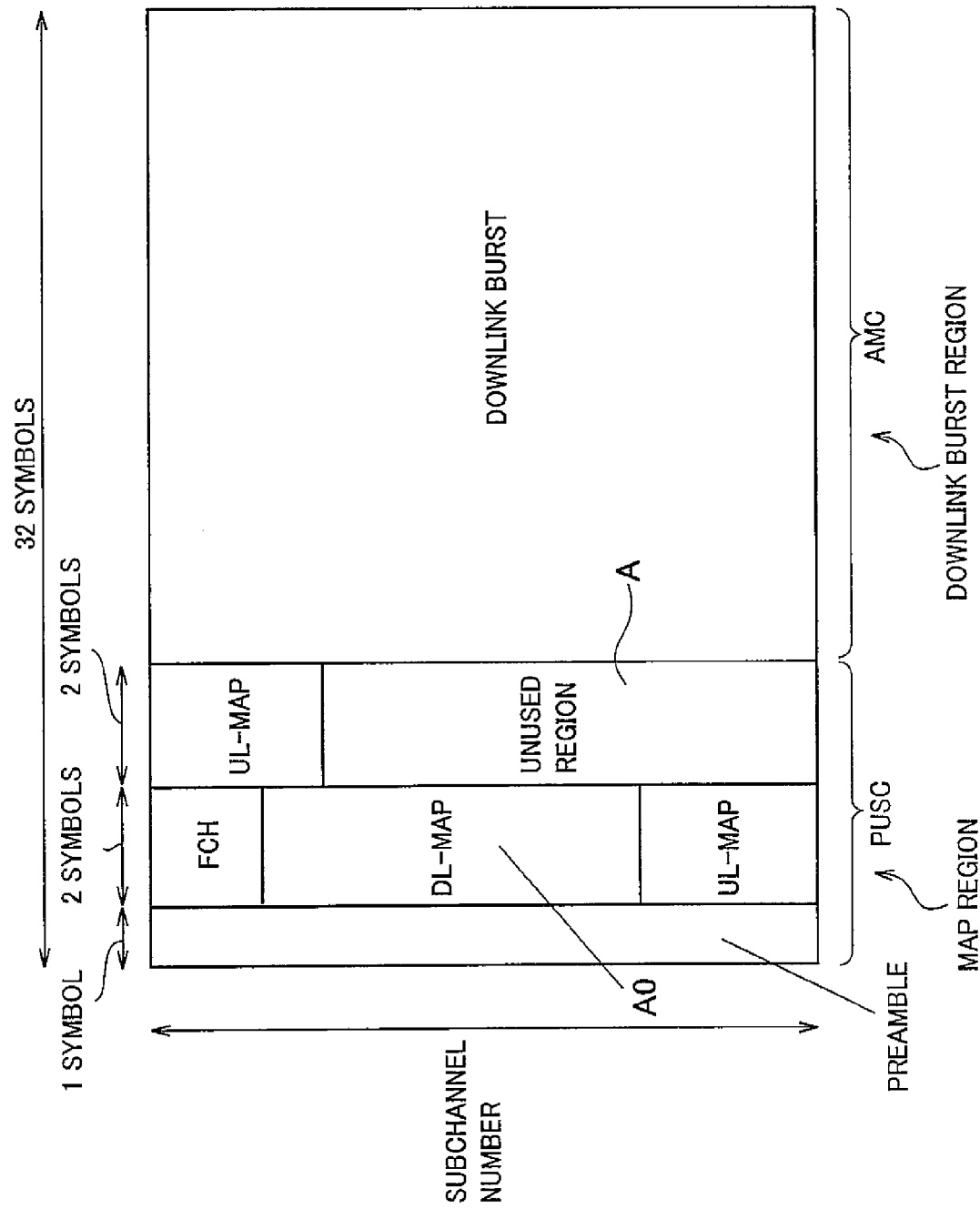
FIG. 1 is a view showing an example of a frame structure to be transmitted by a transmitter unit of a conventional WiMAX compatible base station.

To be more precise, as shown in FIG. 1, the MAP region allocator unit 10B is configured to allocate the control information including a "preamble", a "frame control header (FCH)", the "DL-MAP", and an "UL-MAP", as the transmission information in the MAP region.

Here, the "DL-MAP" is the "allocation information of the downlink burst" containing a position in the downlink burst region where the downlink burst is allocated. The "UL-MAP" is "allocation information of the uplink burst" containing a position in an uplink burst region (not shown) where the uplink burst is allocated.

Figures 7, 8:
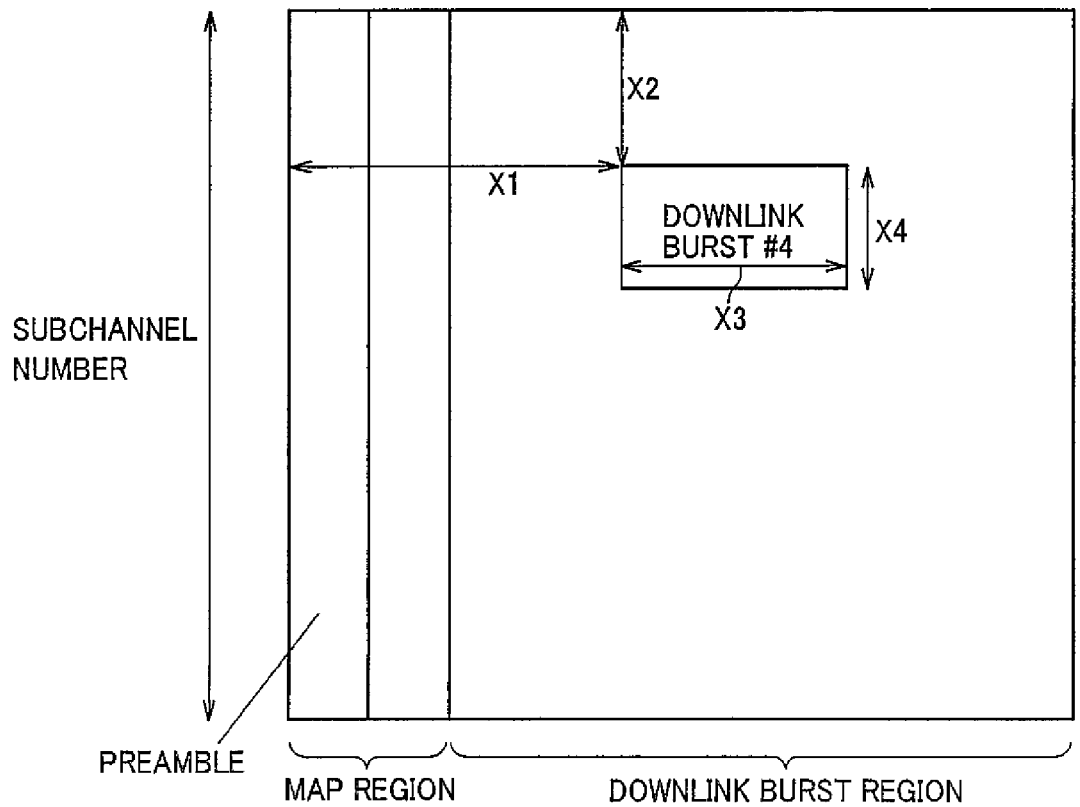
FIG. 7 is a view showing an example a format of "Different burst profiles IE" included in DL-MAP to be created by a MAP region allocator unit of the WiMAX compatible base station according to the first embodiment of the present invention.
FIG. 8 is a view for explaining the way to specify the downlink burst in the first embodiment.

For example, the MAP region allocator unit 10B is configured to create "DL-MAP" including "Different burst profiles IE (Information Element)" as shown in FIG. 7, so as to allocate the DL-MAP as the transmission information in the MAP region.

In an example of FIG. 7, as fields included in the "Different burst profiles IE", "DIUC (Downlink Interval Usage Code)", "CID (Connection ID)", "OFDMA Symbol offsets", "Sub-channel offsets", "No. OFDMA triple symbol", "No. Sub-channel", "Repetition Coding Indication" and the like are assumed.

The "DIUC" is a field showing a modulation class to be used in the downlink bursts. The "CID" is a field to be used for judging whether or not the received downlink burst is a downlink burst to be addressed to the WiMAX compatible mobile station SS, in the WiMAX compatible mobile station SS.

The "OFDMA Symbol offsets" is a field showing an offset (a symbol direction) from the top of the frame constituting the downlink burst, which is corresponding to "X1" in FIG. 8. The "Subchannel off sets" is a field showing an off set (a subchannel direction) from the top of the frame constituting the downlink burst, which is corresponding to "X2" in FIG. 8.

The "No. OFDMA triple symbol" is a field showing the number of symbols to be used in the downlink burst, which is corresponding to "X3" in FIG. 8. The "No. Subchannel" is a field showing the number of subchannels to be used in the downlink burst, which is corresponding to "X4" in FIG. 8.

The "Repetition Coding Indication" is a field showing the number of times for transmitting data to be stored in the downlink burst.

Meanwhile, the "FCH" defines a profile of the downlink burst in the "DL-MAP", and includes a DLFP.

When the MAP region allocator unit 10B detects an unused region where no transmission information is allocated in the above-described frame structure after allocating the transmission information in the MAP region, the MAP region allocator unit 10B is configured to reallocate the allocation information (DL-MAP) as the transmission information in the MAP region by use of the detected unused region.

For example, the MAP region allocator unit 10B is configured to detect an unused region A where no transmission information is allocated in the MAP region after allocating the transmission information (the preamble, the FCH, the DL-MAP, and the UL-MAP) in the MAP region as shown in FIG. 1, and to reallocate the DL-MAP to a region A1 as well as to reallocate the UL-MAP to a region A2 as the transmission information in the detected unused region A.

Specifically, the MAP region allocator unit 10B is configured to insert the DL-MAP to a MAP region A0, and thereafter to insert the DL-MAP repeatedly to the unused region A1.

Here, the MAP region allocator unit 10B is configured to allocate a wireless channel including a subcarrier and a time slot, to the transmission information in the MAP region.

Note that the MAP region allocator unit 10B is configured to apply a subcarrier allocating method (permutation) of a partially used sub-channelization (PUSC) mode, to the transmission information in the MAP region.

Moreover, in the example shown in FIG. 1, the MAP region allocator unit 10B includes a region in the MAP region for inserting the preamble formed of a 1-symbol-based time slot. On the other band, the regions for inserting the FCH, the DL-MAP, and the UL-MAP are formed of 2-symbol-based time slots.

The MAP region allocator unit 10B is configured to create a DLFP, based on the allocation result.

The MAP region allocator unit 10B is configured to create an "Extended_Repetition_Coding_Indication" field as shown in FIG. 10, in addition to fields included in the conventional DLFP.

The "Extended_Repetition_Coding_Indication" field indicates that the process for inserting the DL-MAP repeatedly in the unused region according to the present invention is not performed, if "b0" is set in the "Extended_Repetition_Coding_Indication" field.

On the other hand, the "Extended_Repetition_Coding_Indication" field indicates that the process for inserting the DL-MAP repeatedly in the unused region according to the present invention is performed, if "b1" is set in the "Extended_Repetition_Coding_Indication" field.

Note that, as the fields included in the conventional DLFP, "Used Subchannel bitmap", "Repetition_Coding_Indication", "Coding_Indication", "DL-MAP_Length" and the like is assumed, as shown in FIG. 10.

The downlink burst region allocator unit 10C is configured to allocate the downlink burst received by the receiver unit 10A, as the transmission information in the downlink burst region, in accordance with the above-described control information.

Here, the downlink burst region allocator unit 10C is configured to allocate a wireless channel including a subcarrier and a time slot, to the transmission information in the downlink burst region.

Note that the downlink burst region allocator unit 10C is configured to apply a subcarrier allocating method of an AMC mode to the transmission information in the downlink burst region, in the example shown in FIG. 1. Alternatively, it is possible to apply the subcarrier allocating method of the PUSC mode to the transmission information in the downlink burst region.

However, it is not possible to switch the subcarrier allocating method between the AMC mode and the PUSC mode in the middle of the same symbol sequences.

Moreover, the downlink burst region allocator unit 10C is configured to apply the subcarrier allocating method of the AMC mode by use of 2-symbol-based, 3-symbol-based, or 6-symbol-based time slots.

The encoder unit 10E is configured to execute an encoding process for the above-described transmission information by using the allocation results by the MAP region allocator unit 10B and the downlink burst region allocator unit 10C.

The transmitter unit 10F is configured to transmit the transmission information to which the encoder 10E has executed the encoding process.

To be more precise, the transmitter unit 10F is configured to transmit the DL-MAP (allocation information of the downlink burst) constituting the transmission information in the MAP region with the non-directional beam, while transmitting the downlink burst constituting the transmission information in the downlink burst region either with the non-directional beam or with the directional beam.

The WiMAX compatible mobile station SS is a mobile station compatible with the protocol provided by the WiMAX, and is configured to receive the downlink burst from the WiMAX compatible base station BS by use of the frame structure including the MAP region (the first region) and the downlink burst region (the second region).

Figure 11:
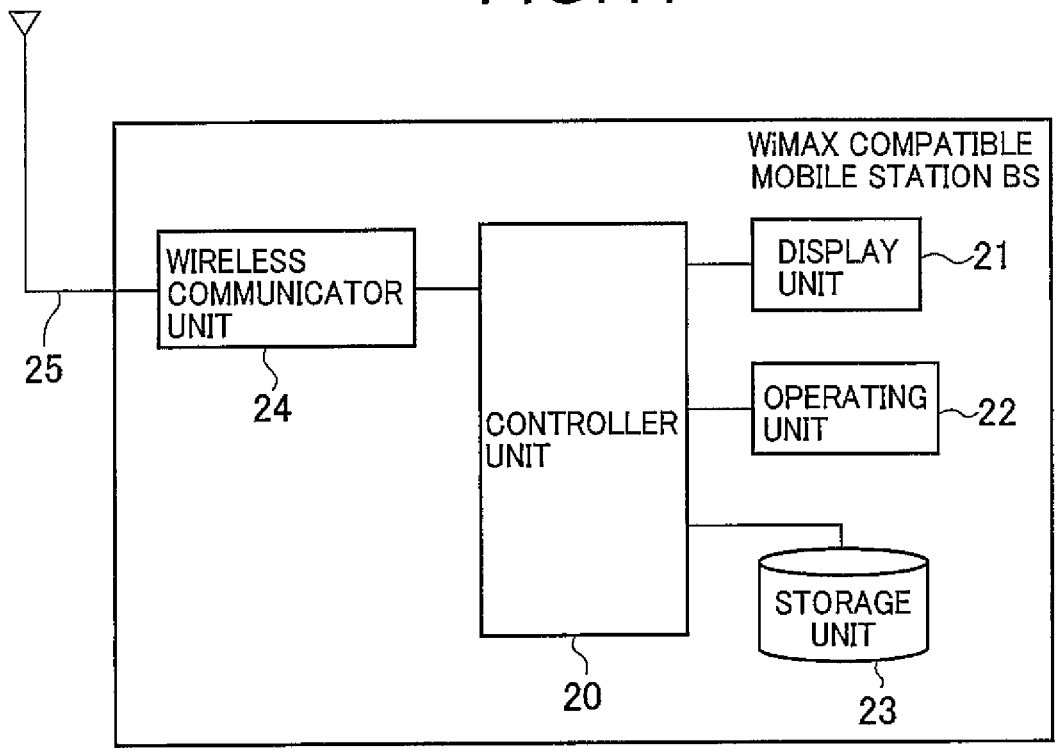
FIG. 11 is a hardware functional block diagram of a WiMAX compatible mobile station according to the first embodiment of the present invention.

The WiMAX compatible mobile station SS has a hardware configuration as shown in FIG. 11, which includes a controller unit 20, a display unit 21, an operating unit 22, a storage unit 23, and a wireless communicator unit 24.

The display unit 21 is formed of a liquid crystal display and the like. The operating unit 22 is formed of key input buttons and the like. The storage unit 23 is formed of a flash memory and the like.

Meanwhile, the wireless communicator unit 24 is configured to perform wireless communication with the WiMAX compatible base stations BS through a transmission-reception antenna 25.

The controller unit 20 is formed of a CPU or the like, and is configured to control the respective units 21 to 24.

Figure 12:
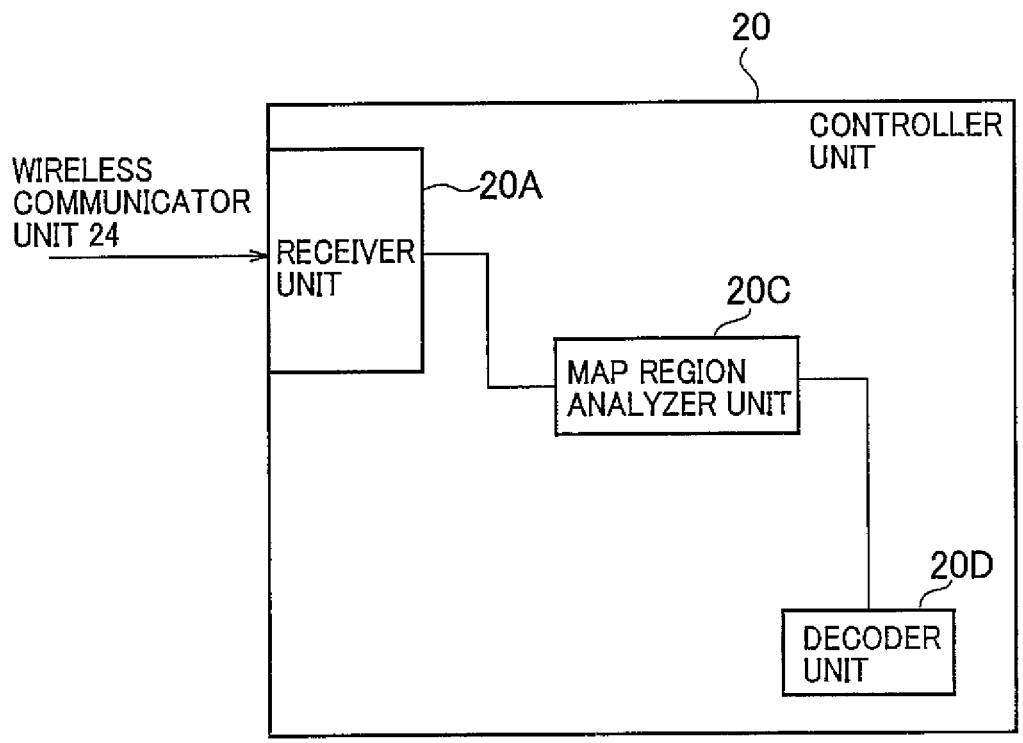
FIG. 12 is a software functional block diagram of a controller unit of the WiMAX compatible mobile station according to the first embodiment of the present invention.

The controller unit 20 has a software configuration as shown in FIG. 12, which includes a receiver unit 20A, a MAP region analyzer unit 20C, and a decoder-unit 20D.

The receiver unit 20A is configured to receive the DL-MAP and the FCH (the DLFP) transmitted with the non-directional beam as the transmission information in the MAP region (the first region), and to receive the downlink burst transmitted either with the non-directional beam or with the directional beam as the transmission information in the downlink burst region (the second region).

The MAP region analyzer unit 20C is configured to detect a position or positions in the MAP region, where the DL-MAP are allocated, using the DLFP acquired by the receiver unit 20A.

To be more precise, the MAP region analyzer unit 20C is configured to judges whether the "Extended_Repetition_Coding_Indication" field in the DLFP is set to "b0" or "b1".

Then, the MAP region analyzer unit 20C determines that the "process to repeatedly insert the same DL-MAP to the unused region" according to the present invention is executed in the case of the judgment that "b1" is set to the field, and thereafter detects the plurality of positions in the MAP region where the DL-MAP are allocated.

Figure 9:
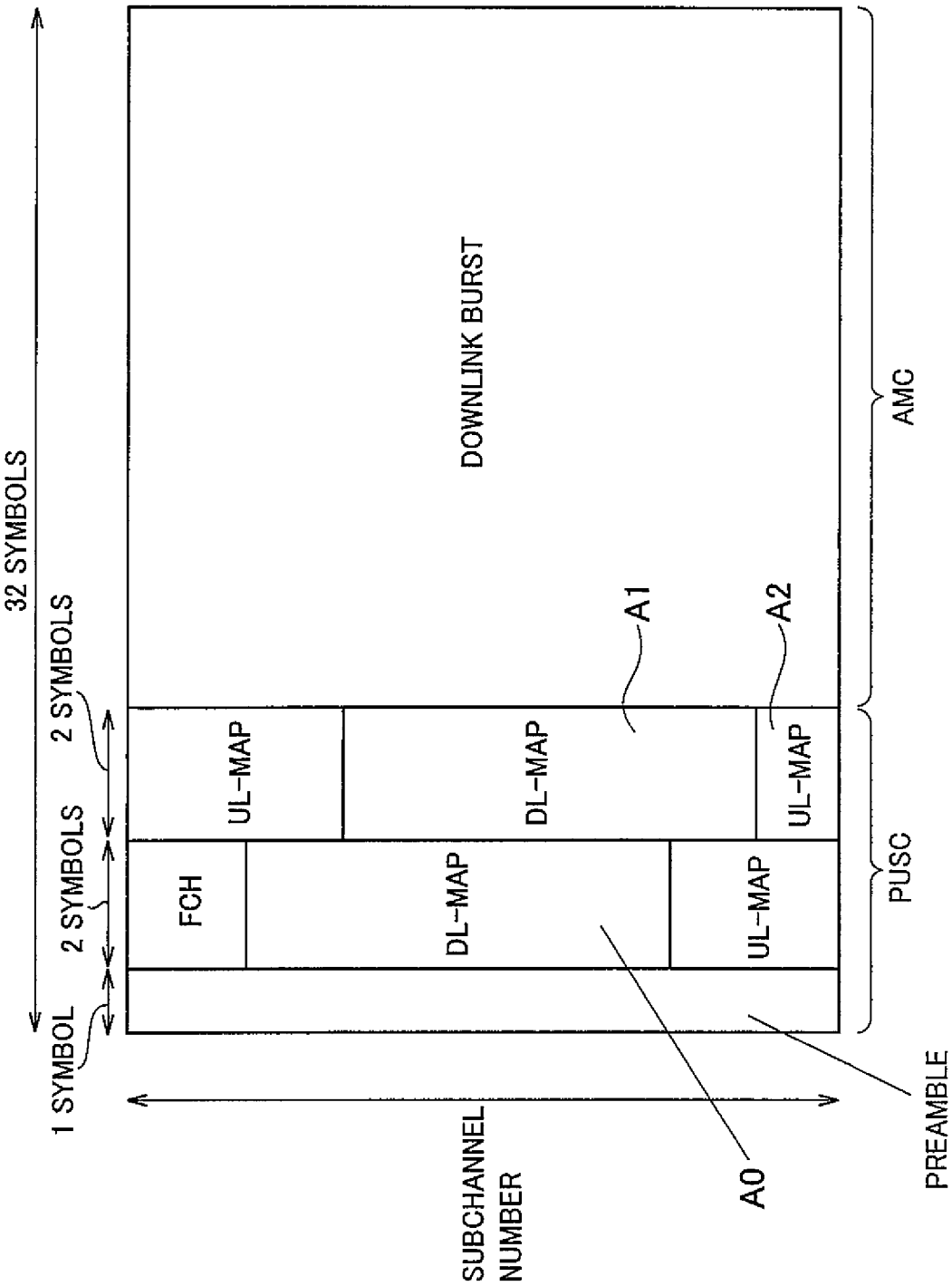
FIG. 9 is a view showing an example of a frame structure to be transmitted by a transmitter unit of the WiMAX compatible base station according to the first embodiment of the present invention.

Specifically, in the example shown in FIG. 9, the MAP region analyzer unit 20C judges that the DL-MAP is repeatedly inserted not only to the region A0 in the MAP region but also to the unused region A1 in the MAP region.

On the other hand, the MAP region analyzer unit 20C determines that the "process to repeatedly insert the same DL-MAP to the unused region" according to the present invention is not executed in the case of the judgment that "b0" is set to the field, and thereafter detects the single position in the MAP region where the DL-MAP is allocated.

Specifically, in the example shown in FIG. 9, the MAP region analyzer unit 20C judges that the DL-MAP is inserted only to the region A0 in the MAP region (that the DL-MAP is not repeatedly inserted to the unused region A1 in the MAP region).

The decoder unit 20D is configured to decode the downlink burst using the DL-MAP allocated to the position or positions detected by the MAP region analyzer unit 20C.

To be more precise, the decoder unit 20D is configured to detect the position in the downlink burst where the downlink burst is allocated, in accordance with the DL-MAP allocated to the position or positions detected by the MAP region analyzer unit 20C, and to subject the downlink burst allocated to the detected position to a given decoding process.

Operations of the Mobile Communication System According to the First Embodiment of the Present Invention Operations of the mobile communication system according to the first embodiment of the present invention will be described with reference to FIG. 13 and FIG. 14.

First, operations of the WiMAX compatible base station BS of this embodiment will be described with reference to FIG. 13.

Figure 13:
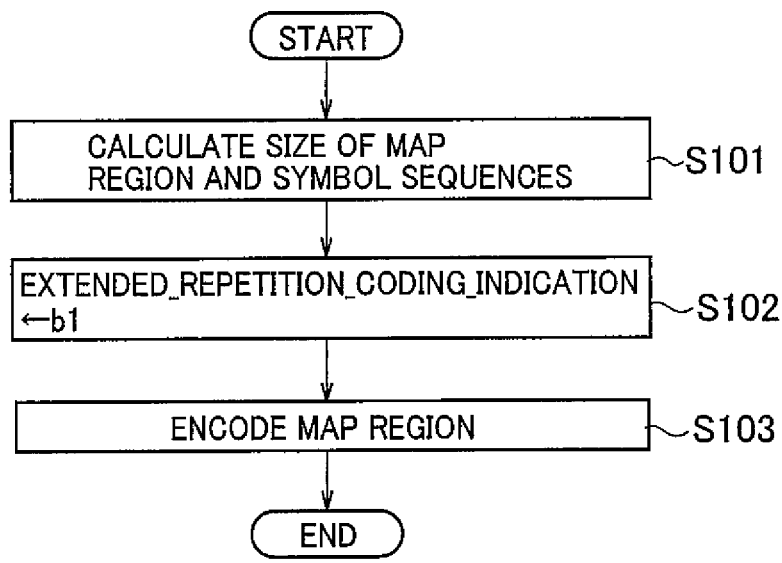
FIG. 13 is a flowchart showing operations of the WiMAX compatible base station according to the first embodiment of the present invention.

As shown in FIG. 13, in step S101, the MAP region allocator unit 10B calculates the control information concerning the downlink burst (for example, the preamble, the FCH, the DL-MAP, the UL-MAP) received by the receiver unit 10A, namely, the size of the MAP region and a symbol sequences constituting the MAP region.

Next, the MAP region allocator unit 10B allocates the calculated control information as the transmission information in the MAP region.

Then, after allocating the above-described control information as the transmission information in the MAP region, the MAP region allocator unit 10B detects the unused region in the MAP region, and reallocates the same DL-MAP as the above-mentioned DL-MAP to the detected unused region.

Specifically, the MAP region allocator unit 10B repeatedly inserts the DL-MAP (and the UL-MAP) to the MAP region so as to eliminate the unused region in the MAP region.

In step S102, the MAP region allocator unit 10B creates the "Extended_Repetition_Coding_Indication" field in addition to the DLFP similar to the conventional example, and sets "b1" to that field.

In step S103, the downlink burst region allocator unit 10C allocates a plurality of downlink burst to be addressed to the WiMAX compatible mobile station SS as the transmission information in the downlink burst region, by referring the allocation result by the the MAP region allocator unit 10B And, the encoder unit 10E subjects the above-described transmission information to the encoding process by using the allocation results by the MAP region allocator unit 10B.

Thereafter, the transmitter unit 10F transmits the transmission information in the MAP region (including the DL-MAP) with the non-directional beam, and then transmits the transmission information in the downlink burst region (including the downlink burst) either with the non-directional beam or with the directional beam.

Second, operations of the WiMAX compatible mobile station SS of this embodiment will be described with reference to FIG. 14.

Figure 14:
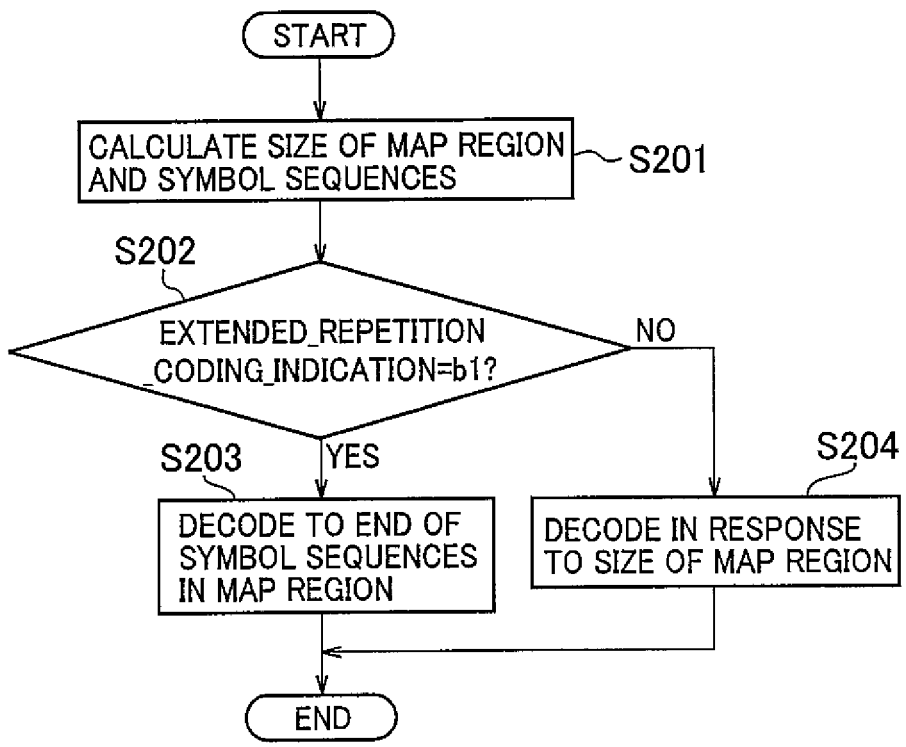
FIG. 14 is a flowchart showing operations of the WiMAX compatible mobile station according to the first embodiment of the present invention.

As shown in FIG. 14, in step S201, the MAP region analyzer unit 20C acquires the control information concerning the downlink burst (for example, the preamble, the FCH (DLFP), the DL-MAP, the UL-MAP), namely, the information concerning the size of the MAP region and the symbol sequences constituting the MAP region, from among the transmission information acquired by the receiver unit 20A.

In step S202, the MAP region analyzer unit 20C judges whether the "Extended_Repetition_Coding_Indication" field in the DLFP is set to "b0" or "b1".

When the judgment is made that the "Extended_Repetition_Coding_Indication" field is set to "b1", the MAP region analyzer unit 20C determines in step S203 that the "process to repeatedly insert the same DL-MAP to the unused region" is executed.

Then, the decoder unit 20D can restore the DL-MAP repeatedly inserted to the unused region by decoding to the end of the symbol sequences constituting the MAP region (to the unused region A in FIG. 1).

On the other hand, when the judgment is made that the "Extended_Repetition_Coding_Indication" field is set to "b0", the MAP region analyzer unit 20C determines in step S204 that the "process to repeatedly insert the same DL-MAP to the unused region" is not executed.

Then, the decoder unit 20D executes decoding in response to the above-mentioned size of the MAP region (to a position immediately in front of the unused region A in FIG. 1), and withholds decoding therefrom to the end of the symbol sequences constituting the MAP region.

To be concrete, the MAP region analyzer unit 200 detects the unused region in the MAP region, based on the following procedures.

First, the MAP region analyzer unit 20C calculates the size of the DL-MAP, by (the number of slots of the DL-MAP: "DL-MAP_Length")×(the number of times for transmitting the DL-MAP: "Repetition_Coding_Indication")×(slot size (known)), with referring to the DLFP.

Second, the MAP region analyzer unit 20C calculates the size of the UL-MAP, by (the number of used symbols: "No. OFDMA triple profile IE")×(the number of used subchannels: "No. Subchannel")×(the number of times for transmitting data to be stored in the downlink burst: "Repetition_Coding_Indication")×(symbol size (known)), by referring to the "Different burst profile IE" included in the DL-MAP.

Third, the MAP region analyzer unit 20C calculates the size of the unused region by (the size of the MAP region (known))−(the size of the DL-MAP)−(the size of the UL-MAP). As a result, the MAP region analyzer unit 20C detects a portion between a starting position and the end of the MAP region, the size of portion corresponding to the size of the MAP region, as the unused region.

Thereafter, the decoding unit 20D decodes the downlink burst bases on the analyzed result (DL-MAP).

Operation and Effect of the Mobile Communication System According to the First Embodiment of the Present Invention According to the mobile communication system of this embodiment, when the MAP region allocator unit 10B detects the unused region A in the MAP region, the MAP region allocator unit 10B is configured to repeatedly allocate the DL-MAP to the detected unused region A. Consequently, it is possible to improve reception probability for the DL-MAP without substantially increasing a proportion of the DL-MAP in the frame structure.

Second Embodiment of the Present Invention

A second embodiment of the present invention will be described with reference to FIG. 15 to FIG. 18. The following description will mainly focus on differences of the second embodiment of the present invention from the first embodiment.

Figure 2:
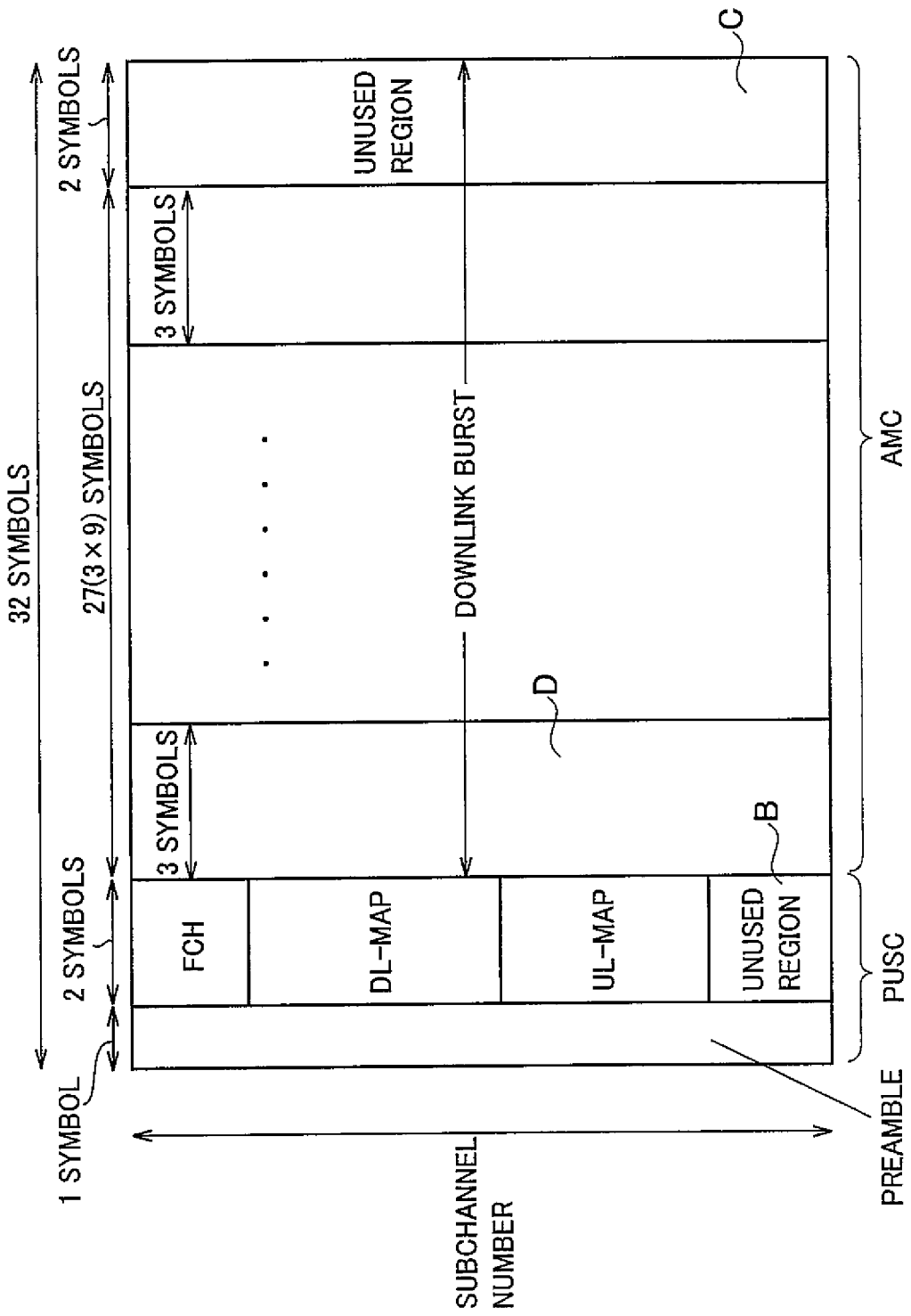
FIG. 2 is a view showing another example of the frame structure to be transmitted by the transmitter unit of the conventional WiMAX compatible base station.

As shown in FIG. 2, a MAP region allocator unit 10B of a WiMAX compatible base station BS of this embodiment is configured to detect an unused region B that is a region where no transmission information (the preamble, the FCH, the DL-MAP, and the UL-MAP) is allocated in a MAP region after allocating the transmission information to the MAP region, and to detect an unused region C that is a region where no transmission information (downlink bursts addressed to a plurality of WiMAX compatible mobile stations SS) is allocated in a downlink burst region after allocating the transmission information to the downlink burst region.

Figure 15:
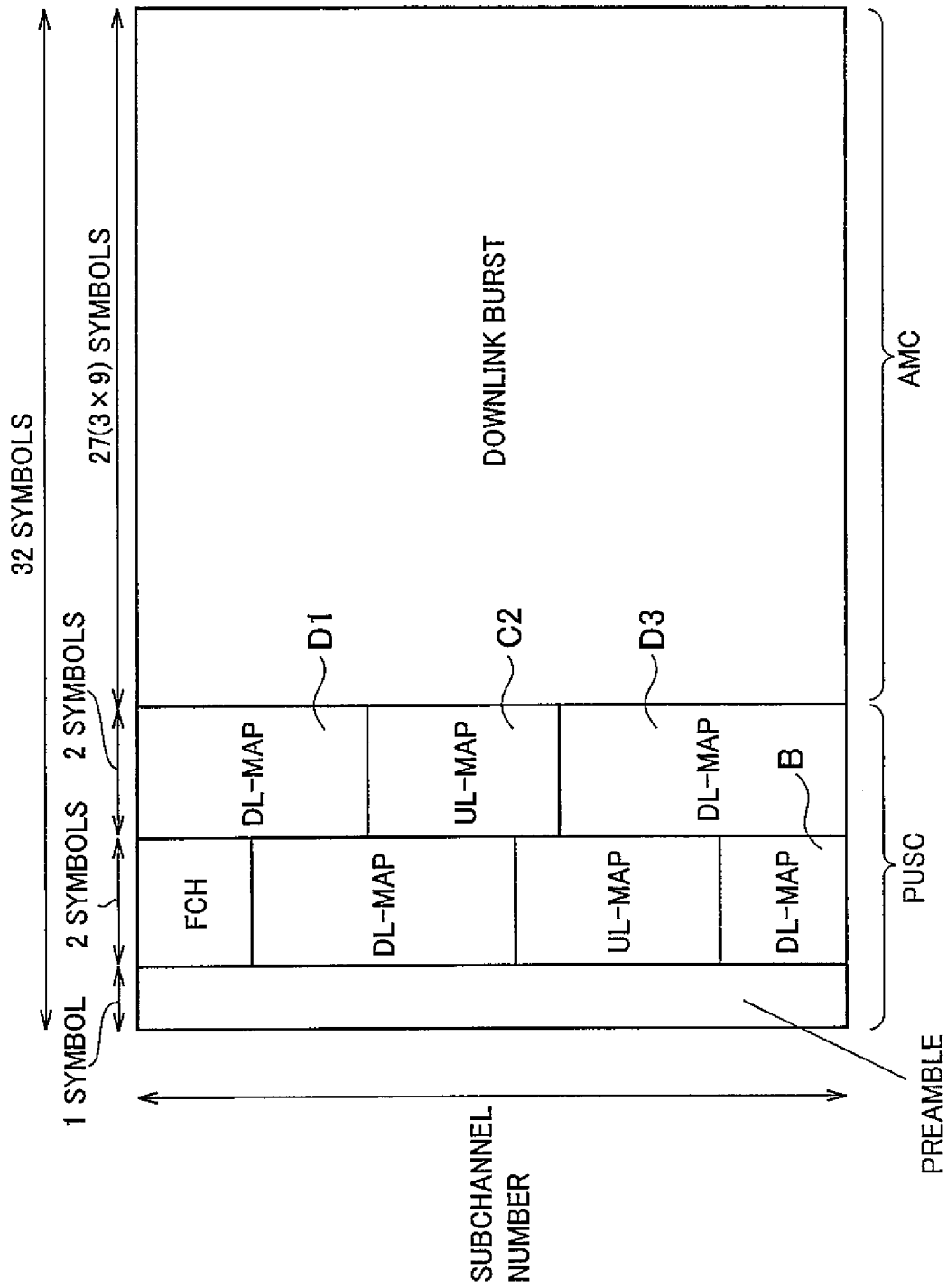
FIG. 15 is a view showing an example of a frame structure to be transmitted by a transmitter unit of the WiMAX compatible base station according to a second embodiment of the present invention.

In this case, as shown in FIG. 15, the MAP region allocator unit 10B is configured to reduce the downlink burst region by the size equivalent to the unused region C detected in the downlink burst region, while extending the MAP region by the same size, and to reallocate the same allocation information of the downlink burst to regions D1 and D3, as the transmission information in an extended MAP region D.

Moreover, as shown in FIG. 15, the MAP region allocator unit 10B is configured to reallocate the same DL-MAP as the transmission information in the unused region B detected in the MAP region, and to reallocate the same UL-MAP as the transmission information in the unused region B detected in the MAP region.

Meanwhile, the MAP region allocator unit 10B of the WiMAX compatible base station BS of this embodiment is configured to create an "Extended_Repetition_Coding_Indication" field and an "Extended_Repetition_Symbol_number" field as shown in FIG. 16, in addition to fields included in the conventional DLFP.

The "Extended_Repetition_Coding_Indication" field is the same as the "Extended_Repetition_Coding_Indication" field in the above-described first embodiment.

The "Extended_Repetition_Symbol_number" field indicates how many symbol sequences in the unused region are reduced in the unused region in the downlink burst region and extended in the MAP region.

When the "Extended_Repetition_Symbol_number" field is set to "b000", the field indicates that the same DL-MAP is not repeatedly inserted to the unused region in the downlink burst region (i.e. that the same DL-MAP is repeatedly inserted only to the unused region in the MAP region).

Meanwhile, when the "Extended_Repetition_Symbol_number" field is set to "b001", the field indicates that the unused region in the downlink burst region in the size equivalent to 2 symbol sequences is reduced and the MAP region is extended in the same size, and that the same DL-MAP is repeatedly inserted not only to the unused region in the MAP region but also to the extended MAP region having the size equivalent to 2 symbol sequences.

When the "Extended_Repetition_Symbol_number" field is set to "b010" or "b011", the field indicates that the unused region in the downlink burst region in the size equivalent to 4 or 6 symbol sequences is reduced and the MAP region is extended in the same size, and that the same DL-MAP is repeatedly inserted not only to the unused region in the MAP region but also to the extended MAP region having the size equivalent to 4 or 6 symbol sequences.

A MAP region analyzer unit 20C of a WiMAX compatible mobile station SS of this embodiment detects positions in the MAP region where the DL-MAP are allocated, using the set value in the "Extended_Repetition_Symbol_number" field in the DLFP acquired by the receiver unit 20A.

Next, operations of a mobile communication system according to this embodiment will be described with reference to FIG. 17 and FIG. 18.

First, operations of the WiMAX compatible base station BS of this embodiment will be described with reference to FIG. 17.

Figure 17:
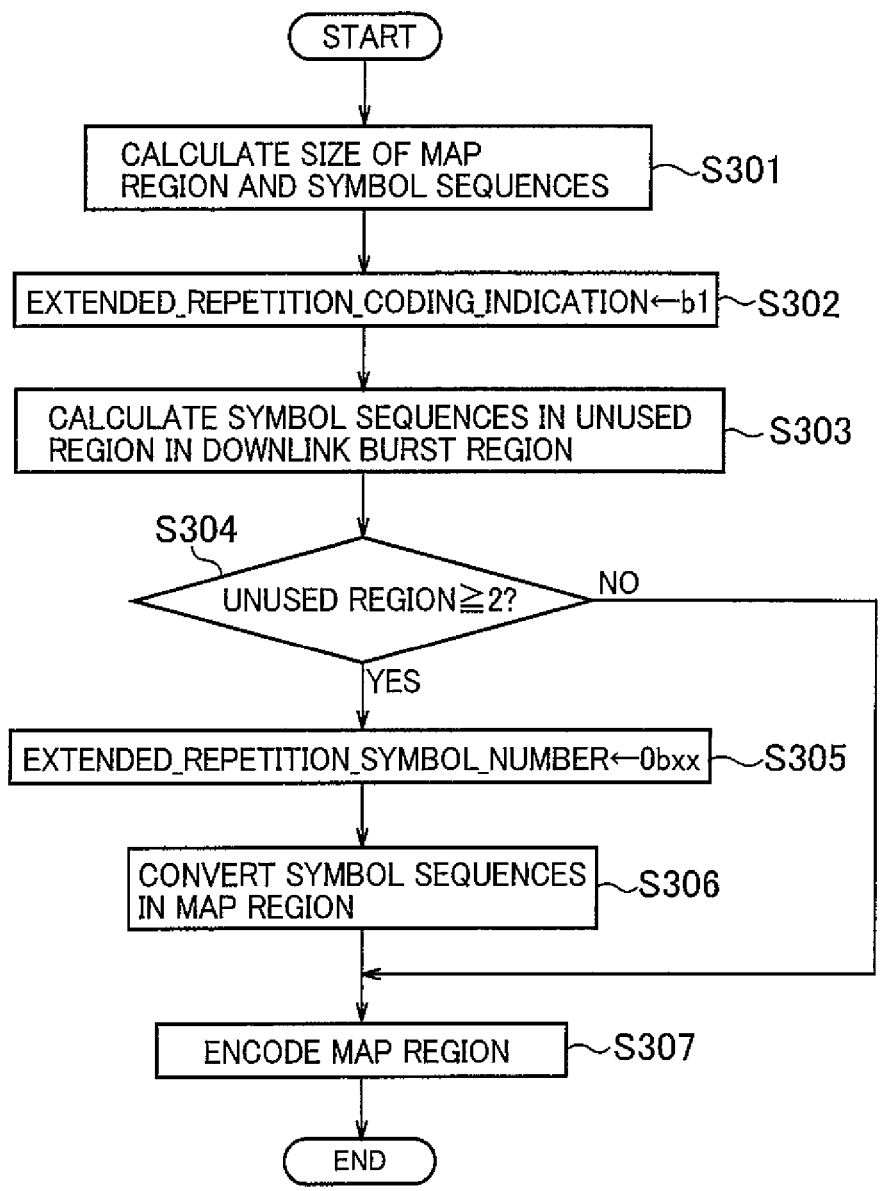
FIG. 17 is a flowchart showing operations of the WiMAX compatible base station according to the second embodiment of the present invention.

As shown in FIG. 17, in step S301, the MAP region allocator unit 10B calculates control information concerning a downlink burst (the preamble, the FCH (DLFP), the DL-MAP, the UL-MAP) received by a receiver unit 10A, namely, the size of the MAP region and symbol sequences constituting the MAP region.

Next, the MAP region allocator unit 10B allocates the calculated control information as the transmission information in the MAP region, while a downlink burst region allocator unit 10C refers to the allocation result by the MAP region allocator unit 10B, and allocates the downlink bursts addressed to a plurality of WiMAX compatible mobile stations SS, as the transmission information in the downlink burst region.

Then, after allocating the above-described control information as the transmission information in the MAP region, the MAP region allocator unit 10B detects the unused region in the MAP region, and reallocates the same DL-MAP as the above-mentioned DL-MAP to the detected unused region.

Specifically, the MAP region allocator unit 10B repeatedly inserts the DL-MAP (and the UL-MAP) to the MAP region, so as to eliminate the unused region in the MAP region.

In step S302, the MAP region allocator unit 10B creates the "Extended_Repetition_Coding_Indication" field, in addition to the DLFP similar to the conventional example, and sets "b1" to that field.

In step S303, the MAP region allocator unit 10B calculates the symbol sequences in the unused region in the downlink burst region.

When the symbol sequences in the unused region are equal to or more than 2 sequences, the operation goes to step S305. When the symbol sequences in the unused region are not equal to or more than 2 sequences, the operation goes to step S307.

In step S305, the MAP region allocator unit 10B sets the "Extended_Repetition_Symbol_number" field in response to the symbol sequences in the unused region in the downlink burst region.

For example, the MAP region allocator unit 10B sets "0b01" to the "Extended_Repetition_Symbol_number" field, when the symbol sequences in the unused region in the downlink burst region are equal to 2 sequences.

In step S307, the MAP region allocator unit 10B reduces the symbol sequences in the downlink burst region in an amount equivalent to the unused region in the downlink burst region, while extending the symbol sequences in the MAP region in the same amount, and reallocates the same allocation information of the downlink burst, as the transmission information in the extended MAP region.

In step S308, an encoder unit 10E subjects the above-described transmission information to an encoding process by using the allocation results by the MAP region allocator unit 10B and the downlink burst region allocator unit 10C.

Thereafter, a transmitter unit 10F transmits the transmission information (including the DL-MAP) in the MAP region with a non-directional beam, and transmits the transmission information (including the downlink burst) in the downlink burst region either with the non-directional beam or with a directional beam.

Second, operations of the WiMAX compatible mobile station SS of this embodiment will be described with reference to FIG. 18.

Figure 18:
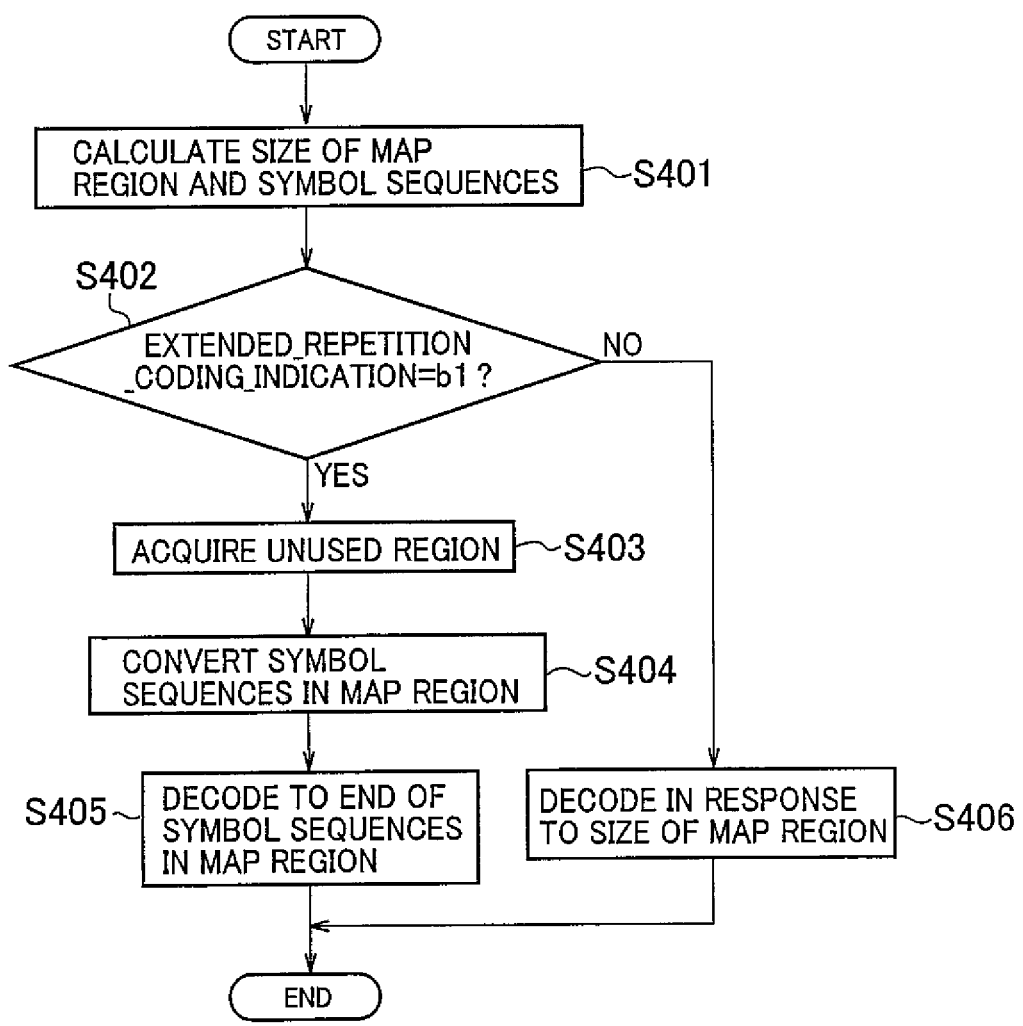
FIG. 18 is a flowchart showing operations of a WiMAX compatible mobile station according to the second embodiment of the present invention.

As shown in FIG. 18, in Step S401, the MAP region analyzer unit 20C acquires the control information concerning the downlink burst (the preamble, the FCH (DLFP), the DL-MAP, the UL-MAP), from among the transmission information received by the receiver unit 20A.

In step S402, the MAP region analyzer unit 20C judges whether the "Extended_Repetition_Coding_Indication" field in the DLFP is set to "b0" or "b1".

The operation goes to Step S403, when the judgment is made that the "Extended_Repetition_Coding_Indication" field is set to "b1". On the other hand, the operation goes to step S406 when the judgment is made that the "Extended_Repetition_Coding_Indication" field is set to "b0".

In step S403, the MAP region analyzer unit 20C acquires the information on the symbol sequences in the unused region in the downlink burst region used for inserting the DL-MAP, based on the set value in the "Extended_Repetition_Symbol_number" field in the DLFP.

In step S404, the MAP region analyzer unit 20C extends the MAP region including the symbol sequences in the MAP region defined in the original DLFP, in an amount equivalent to the symbol sequences corresponding to the set value in the "Extended_Repetition_Symbol_number" field.

In step S405, a decoder unit 20D can restore the DL-MAP repeatedly inserted to the unused region by decoding to the end (to the unused region D3 in FIG. 15) of the symbol sequences constituting the MAP region extended in step S404 (or the unextended MAP region).

On the other hand, in step S406, the decoder unit 20D executes decoding in response to the above-mentioned size of the MAP region (to a position immediately in front of the unused region B in FIG. 2), and withholds decoding therefrom to the end of the symbol sequences constituting the MAP region.

Third Embodiment of the Present Invention

A third embodiment of the present invention will be described with reference to FIG. 19 to FIG. 22. The following description will mainly focus on differences of the third embodiment of the present invention from the first embodiment and the second embodiment.

Figure 3:
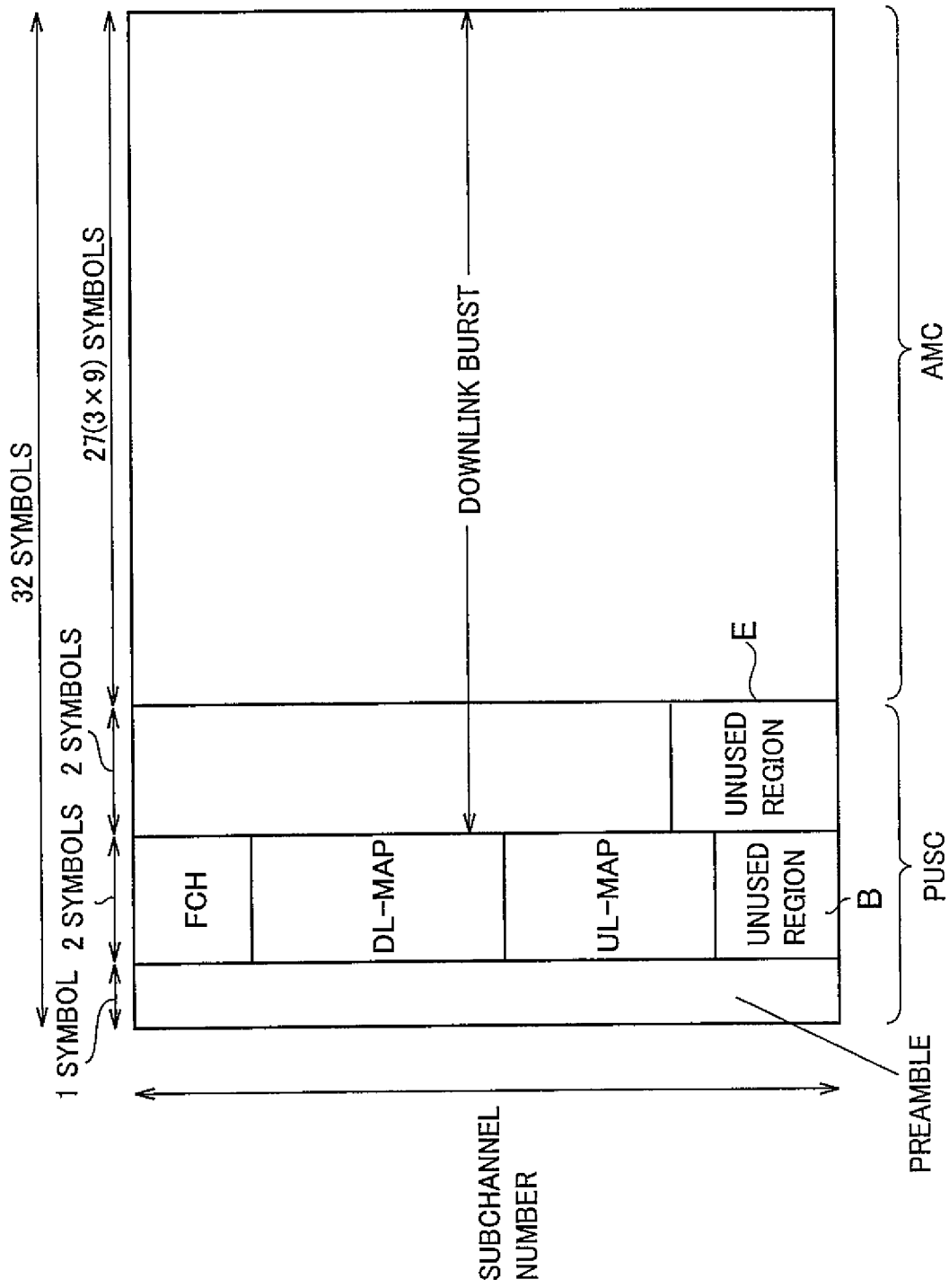
FIG. 3 is a view showing another example of the frame structure to be transmitted by the transmitter unit of the conventional WiMAX compatible base station.

As shown in FIG. 3, a MAP region allocator unit 10B of a WiMAX compatible base station BS of this embodiment is configured to detect an unused region B that is a region where no transmission information (the preamble, the FCH, the DL-MAP, and the UL-MAP) is allocated in a MAP region after allocating the transmission information to the MAP region.

And, the MAP region allocator unit 10B is configured to detect an unused region E that is a region where no transmission information (downlink bursts addressed to a plurality of WiMAX compatible mobile stations SS) is allocated in a downlink burst region after allocating the transmission information to the downlink burst region.

Here, the subcarrier allocating method of the PUSC mode is assumed to be applied to the symbol sequences in the downlink burst region including the unused region E.

Figure 19:
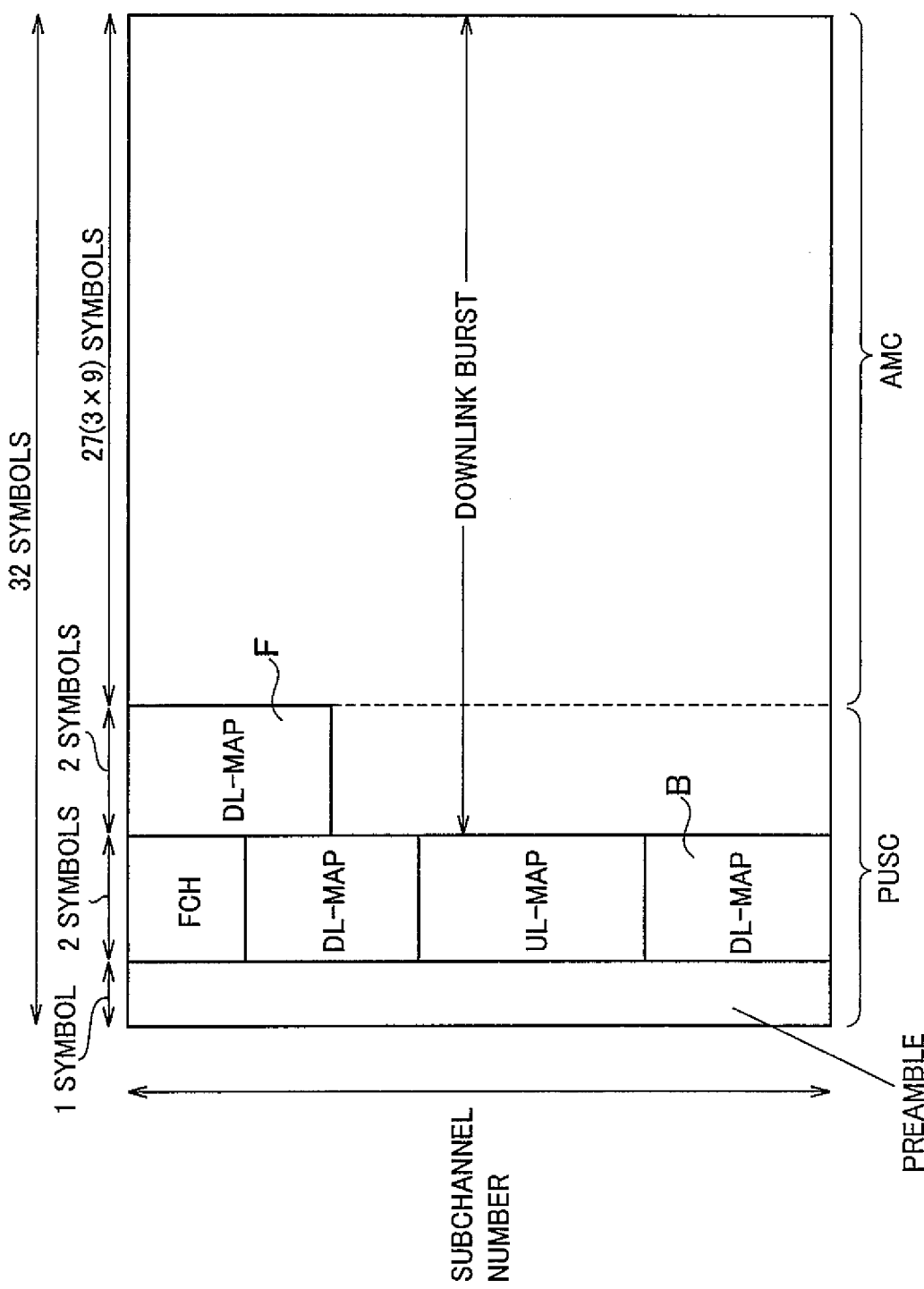
FIG. 19 is a view showing an example of a frame structure to be transmitted by a transmitter unit of the WiMAX compatible base station according to a third embodiment of the present invention.

In this case, as shown in FIG. 19, the MAP region allocator unit 10B is configured to reduce the downlink burst region in an amount equivalent to the size of the unused region B detected in the downlink burst region, while extending the MAP region in the same amount, and to reallocate the allocation information of the downlink burst as the transmission information in an extended MAP region F.

Moreover, as shown in FIG. 19, the MAP region allocator unit 10B is configured to reallocate the same DL-MAP as the transmission information in the unused region B detected in the MAP region, and to reallocate the same UL-MAP as the transmission information in the unused region B detected in the MAP region.

Meanwhile, the MAP region allocator unit 10B of the WiMAX compatible base station BS of this embodiment is configured to create an "Extended_Repetition_Coding_Indication" field and an "Extended_Repetition_Size" field as shown in FIG. 20, in addition to fields included in the conventional DLFP.

The "Extended Repetition_Coding indication" field is the same as the "Extended_Repetition_Coding_Indication" field in the above-described first embodiment.

The "Extended_Repetition_Size" field indicates the size of the unused region, which is to be used for repeatedly inserting the DL-MAP, from among the unused region in the downlink burst region that applies the PUSC mode.

Here, the unused region is assumed to be located at the end of the downlink burst region that applies the PUSC mode.

A MAP region analyzer unit 20C of a WiMAX compatible mobile station SS of this embodiment detects positions in the MAP region where the DL-MAP are allocated, based on a set value in the "Extended_Repetition_Size" field in the DLFP acquired by the receiver unit 20A.

Next, operations of a mobile communication system according to this embodiment will be described with reference to FIG. 21 and FIG. 22.

First, operations of the WiMAX compatible base station BS of this embodiment will be described with reference to FIG. 21.

Figure 21:
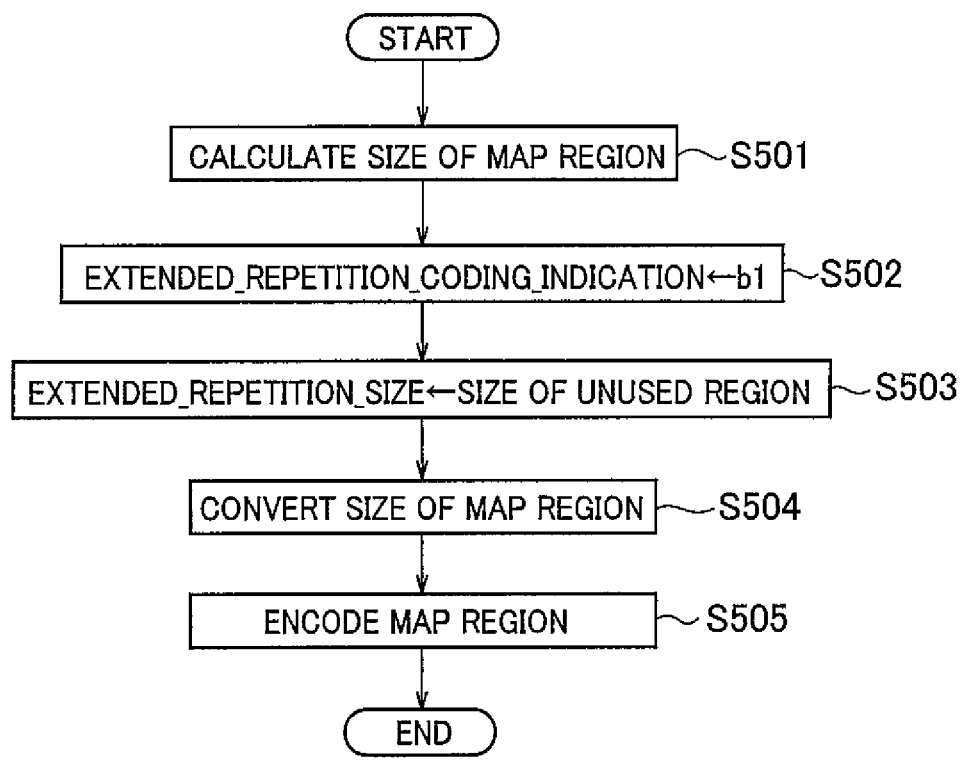
FIG. 21 is a flowchart showing operations of the WiMAX compatible base station according to the third embodiment of the present invention.

As shown in FIG. 21, in Step S501, the MAP region allocator unit 10B calculates control information concerning a downlink burst received by a receiver unit 10A, namely, the size of the MAP region.

Next, the MAP region allocator unit 10B allocates the calculated control information as the transmission information in the MAP region, while a downlink burst region allocator unit 10C refers to the allocation result by the MAP region allocator unit 10B and allocates the downlink bursts addressed to a plurality of WiMAX compatible mobile stations SS as the transmission information in the downlink burst region.

Then, after allocating the above-described control information as the transmission information in the MAP region, the MAP region allocator unit 10B detects the unused region in the MAP region and reallocates the same DL-MAP as the above-mentioned DL-MAP to the detected unused region.

Specifically, the MAP region allocator unit 10B repeatedly inserts the DL-MAP (and the UL-MAP) to the MAP region, so as to eliminate the unused region in the MAP region.

In step S502, the MAP region allocator unit 10B creates the "Extended_Repetition_Coding_Indication" field, in addition to the DLFP similar to the conventional example, and sets "b1" to that field.

In step S503, the MAP region allocator unit 10B calculates the size of the unused region (the size counted from the end) in the downlink burst region applying the PUSC mode. The MAP region allocator unit 10B sets the "Extended_Repetition_Size" field in response to the size of the unused region in the downlink burst region.

For example, MAP region allocator unit 10B sets "2" to the "Extended_Repetition_Size" field, when the size of the unused region in the downlink burst region is equal to 2 subchannels.

In step S504, the MAP region allocator unit 10B reduces the size of the downlink burst region applying the PUSC mode in an amount equivalent to the size of the unused region in the downlink burst region, while extending the size of the MAP region in the same amount, and reallocates the same allocation information of the downlink burst as the transmission information in the extended MAP region.

In step S505, an encoder unit 10B subjects the above-described transmission information to an encoding process by using the allocation results by the MAP region allocator unit 10B and the downlink burst region allocator unit 10C.

Thereafter, a transmitter unit 10F transmits the transmission information (including the DL-MAP) in the MAP region with a non-directional beam, and transmits the transmission information (including the downlink burst) in the downlink burst region either with the non-directional beam or with a directional beam.

Second, operations of the WiMAX compatible mobile station SS of this embodiment will be described with reference to FIG. 22.

As shown in FIG. 22, in Step S601, the MAP region analyzer unit 20C acquires the control information concerning the downlink burst, from among the transmission information received by a receiver unit 20A.

In step S602, the MAP region analyzer unit 20C judges whether the "Extended_Repetition_Coding_Indication" field in the DLFP is set to "b0" or "b1".

The operation goes to step S603, when the judgment is made that the "Extended_Repetition_Coding_Indication" field is set to "b1". On the other hand, the operation goes to step S605, when the judgment is made that the "Extended_Repetition_Coding_Indication" field is set to "b0".

In step S603, the MAP region analyzer unit 20C acquires the information on the size of the unused region in the downlink burst region used for inserting the DL-MAP, based on the set value in the "Extended_Repetition_Size" field in the DLFP.

In step S604, the MAP region analyzer unit 20C extends the MAP region including the symbol sequences in the MAP region defined in the original DLFP, in an amount equivalent to the size corresponding to the set value in the "Extended_Repetition_Size".

In step S605, a decoder unit 20D can restore the DL-MAP repeatedly inserted to the unused region by decoding the MAP region (the unused region F in FIG. 19) extended in step S604 (or the unextended MAP region).

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

The invention claimed is:

1. A base station configured to transmit a downlink burst to a mobile station by use of a frame structure having a first region and a second region, the first region being a control region, the base station comprising:
   an allocator unit configured to allocate allocation information indicating a time-frequency resource used for a transmission of the downlink burst as transmission information in the first region, and to allocate the downlink burst as transmission information in the time frequency resource of the second region; and
   a transmitter unit configured to transmit the allocation information of the downlink burst with a non-directional beam, and to transmit the downlink burst with a non-directional beam or a directional beam;
   wherein, when detecting an unused region in the first region where no transmission information is allocated after allocating the transmission information in the first region in the frame structure, the allocator unit is configured to repeatedly allocate the allocation information in the detected unused region, as the transmission information in the first region.

2. The base station according to claim 1, wherein, when detecting the unused region in the first region after allocating the transmission information in the first region, the allocator unit is configured to repeatedly allocate the allocation information as the transmission information in the unused region.

3. The base station according to claim 1, wherein, when detecting the unused region in the second region after allocating the transmission information in the first region, the allocator is configured to reduce the second region in an amount equivalent to a size of the unused region while extending the first region in the amount, and to repeatedly allocate the allocation information as the transmission information in the extended first region.

4. A mobile communication method for transmitting a downlink burst from a base station to a mobile station by use of a frame structure having a first region and a second region, the first region being a control region, the method comprising:
   allocating, at the base station, allocation information indicating a time-frequency resource used for a transmission of the downlink burst as transmission information in the first region;
   allocating, at the base station, the downlink burst as transmission information in the time frequency resource of the second region;
   detecting, at the base station, an unused region in the first region in the frame structure where no transmission information is allocated after allocating the transmission information in the first region and the second region;
   allocating repeatedly, at the base station, the allocation information in the detected unused region, as the transmission information in the first region;
   transmitting, at the base station, the allocation information of the downlink burst, with a non-directional beam; and
   transmitting, at the base station, the downlink burst with a non-directional beam or a directional beam.

5. The mobile communication method according to claim 4, further comprising:
   receiving, at the mobile station, the allocation information of the downlink burst and a prefix transmitted with the non-directional beam as the transmission information in the first region;
   receiving, at the mobile station, the downlink burst transmitted with the non-directional beam or the directional beam as the transmission information in the second region;
   detecting, at the mobile station, a position in the first region where the allocation information of the downlink burst is allocated, based on the received prefix; and
   decoding, at the mobile station, the downlink burst based on the allocation information of the downlink burst allocated to the detected position.

6. A base station configured to transmit a downlink burst to a mobile station by use of a frame structure having a first region and a second region, the first region being a control region, the base station comprising:
   an allocator unit configured to allocate a plurality of control channel elements for allocation information indicating a time-frequency resource used for a transmission of the downlink burst as an allocation for the mobile station in the first region, and to allocate the downlink burst as transmission information in the time-frequency resource of the second region; and
   a transmitter unit configured to transmit the control allocation information and the down link burst;
   wherein the allocator unit is configured to control a number of the control channel elements allocated to the mobile station in the first region.

* * * * *